US007555553B2

(12) United States Patent
Zhang et al.

(10) Patent No.: US 7,555,553 B2
(45) Date of Patent: *Jun. 30, 2009

(54) PLACING AN OBJECT AT A NODE IN A PEER-TO-PEER SYSTEM BASED ON STORAGE UTILIZATION

(75) Inventors: Zheng Zhang, San Jose, CA (US); Mallik Mahalingam, Sunnyvale, CA (US); Zhichen Xu, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1205 days.

This patent is subject to a terminal disclaimer.

(21) Appl. No.: 10/260,430

(22) Filed: Oct. 1, 2002

(65) Prior Publication Data

US 2004/0064556 A1 Apr. 1, 2004

(51) Int. Cl.
*G06F 13/00* (2006.01)
(52) U.S. Cl. ...................... 709/226; 718/105
(58) Field of Classification Search ................ 718/105, 718/104, 102; 709/226
See application file for complete search history.

(56) References Cited

U.S. PATENT DOCUMENTS

| 5,915,095 | A | 6/1999 | Miskowiec | |
|---|---|---|---|---|
| 6,711,571 | B2 | 3/2004 | Putzolu | |
| 6,826,711 | B2* | 11/2004 | Moulton et al. | 714/6 |
| 7,069,295 | B2* | 6/2006 | Sutherland et al. | 709/203 |
| 2001/0034795 | A1* | 10/2001 | Moulton et al. | 709/244 |
| 2002/0114341 | A1* | 8/2002 | Sutherland et al. | 370/428 |
| 2003/0182421 | A1* | 9/2003 | Faybishenko et al. | 709/224 |
| 2004/0215622 | A1* | 10/2004 | Dubnicki et al. | 707/10 |
| 2005/0108203 | A1* | 5/2005 | Tang et al. | 707/3 |
| 2005/0240591 | A1* | 10/2005 | Marceau et al. | 707/9 |

OTHER PUBLICATIONS

A. Rowstron et al.; Pastry: Scalable, Decentralized Object Location and Routing for Large-Scale Peer-to-Peer Systems; Proceedings of 18th IFIP/ACM international Conference on Distributed Systems Platforms (Middleware 2001); Nov. 2001.*
M. Castro et al.; "Proximity Neighbor Selection in Tree-Based Structured Peer-to-Peer Overlays"; Techinical Report MSR-TR-2003-52; pp. 1-11; Sep. 2003.*
B. Zhao et al.; Tapestry: An Infrastructure for Fault-Tolerant Wide-Area Location and Routing; Report No. UCB/CSD-01-1141; Univ. of California at Berkeley, Computer Science Department; pp. 1-27; Apr. 2001.*
A. Rowstron et al.; Storage Management and Caching in PAST, a Large-Scale, Persistent Peer-to-Peer Storage Utility; Proceedings of the 18th ACM Symposium on Operating Systems Principles; pp. 188-201; 2001.*

(Continued)

*Primary Examiner*—Kenneth R Coulter

(57) ABSTRACT

A peer-to-peer system includes a plurality of nodes. The plurality of nodes includes at least an initial node and a neighboring node. The initial node is operable to determine whether to place an object at either the initial node or another node in the system based on a comparison of storage utilizations for the initial node and the neighboring node.

24 Claims, 6 Drawing Sheets

OTHER PUBLICATIONS

Hung-Chang Hsiao et al.; Modeling and Evaluating Peer-to-Peer Storage ARchitectures; Proceedings of the International Parallel and Distributed Processing Symposium (IPDPS '02); Apr. 15, 2002-Apr. 19, 2002.*

Bolosky, W. et al., "Feasibility of a Serverless Distributed File System Deployed on an Existing Set of Desktop PCs", SIGMETRICS 2000, Santa Clara, CA.

Clarke, I. et al., "Freenet: A Distributed Anonymous Information Storage and Retrieval System", Workshop on Design Issues in Anonymity and Unobservability, 2000, Berkeley, CA.

Dabek, F. et al., "Wide-Area Cooperative Storage with CFS", Symposium on Operating Systems Principles (SOSP), 2001, Banff, Canada.

Druschel, P. et al., PAST: A Large-Scale, Persistent Peer-to-Peer Storage Utility, IEEE 0-7695-1040-X/01, 2001.

Kleiman, S.R.,"Vnodes: An Architecture for Multiple File System Types in Sun UNIX", USENIX Conference, 1986, Atlanta, GA.

Kubiatowicz, J. et al., "OceanStore: An Architecture for Global-Scale Persistent Storage", ASPLOS 2000, MA.

Ratnasamy, S. et al., "A Scalable Content-Addressable Network", ACM SIGCOMM 2001, San Diego, CA.

Roselli, D., et al., "A Comparison of File System Workloads", USENIX Annual Technical Conference, 2000, San Diego, CA.

Stoica, I. et al., "Chord: A Scalable Peer-to-Peer Lookup Service for Internet Applications", ACM SIGCOMM 2001, San Diego, CA.

* cited by examiner

PLACING AN OBJECT AT A NODE IN A PEER-TO-PEER SYSTEM BASED ON STORAGE UTILIZATION

FIELD OF THE INVENTION

The invention is generally related to peer-to-peer systems. More particularly, the invention is related to placing an object in a peer-to-peer system.

BACKGROUND OF THE INVENTION

With the rapid growth of the Internet and the ever-rising demand of applications, building a highly scalable infrastructure is increasingly important. A peer-to-peer (P2P) system provides an infrastructure that may meet those demands, especially for storage systems.

A P2P system of nodes (or peers) interconnected via one or more networks provides a relatively convenient and scalable means for storing and exchanging information. However, current P2P storage systems offer a flat storage space, where no techniques, other than using distributing hash tables to store and retrieve objects, are employed for organizing data stored in the P2P system. Factors for optimizing storage systems, such as storage utilization and data organization, should be considered when building a storage system on a P2P system.

SUMMARY OF THE INVENTION

According to an embodiment of the invention, a method for placing an object in a peer-to-peer system comprises selecting an initial node as a current candidate to place the object; determining a storage utilization for the current candidate; identifying a neighboring node of the current candidate, wherein the identified neighboring node has a lowest storage utilization among at least some neighbor nodes of the current candidate; and comparing the storage utilization of the current candidate to the storage utilization of the identified neighboring node for placing the object.

According to another embodiment of the invention, a plurality of nodes function as a distributed, shared, file system. The plurality of nodes includes at least an initial node and a neighbor node within a predetermined distance to the initial node. The initial node is operable to identify one of the plurality of neighboring nodes having a lowest storage utilization and is operable to determine whether to place an object on itself or to hand over the object to the identified neighboring node based on a comparison of storage utilizations for the initial node and the identified neighboring node having the lowest storage utilization.

According to yet another embodiment of the invention, a node in a peer-to-peer system comprises means for determining a storage utilization for the node, the node being a current candidate for placing an object; means for identifying a neighboring node of the current candidate, wherein the identified neighboring node has a lowest storage utilization among at least some neighbor nodes of the current candidate; and means for comparing the storage utilization of the current candidate to the storage utilization of the identified neighboring node for placing the object.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
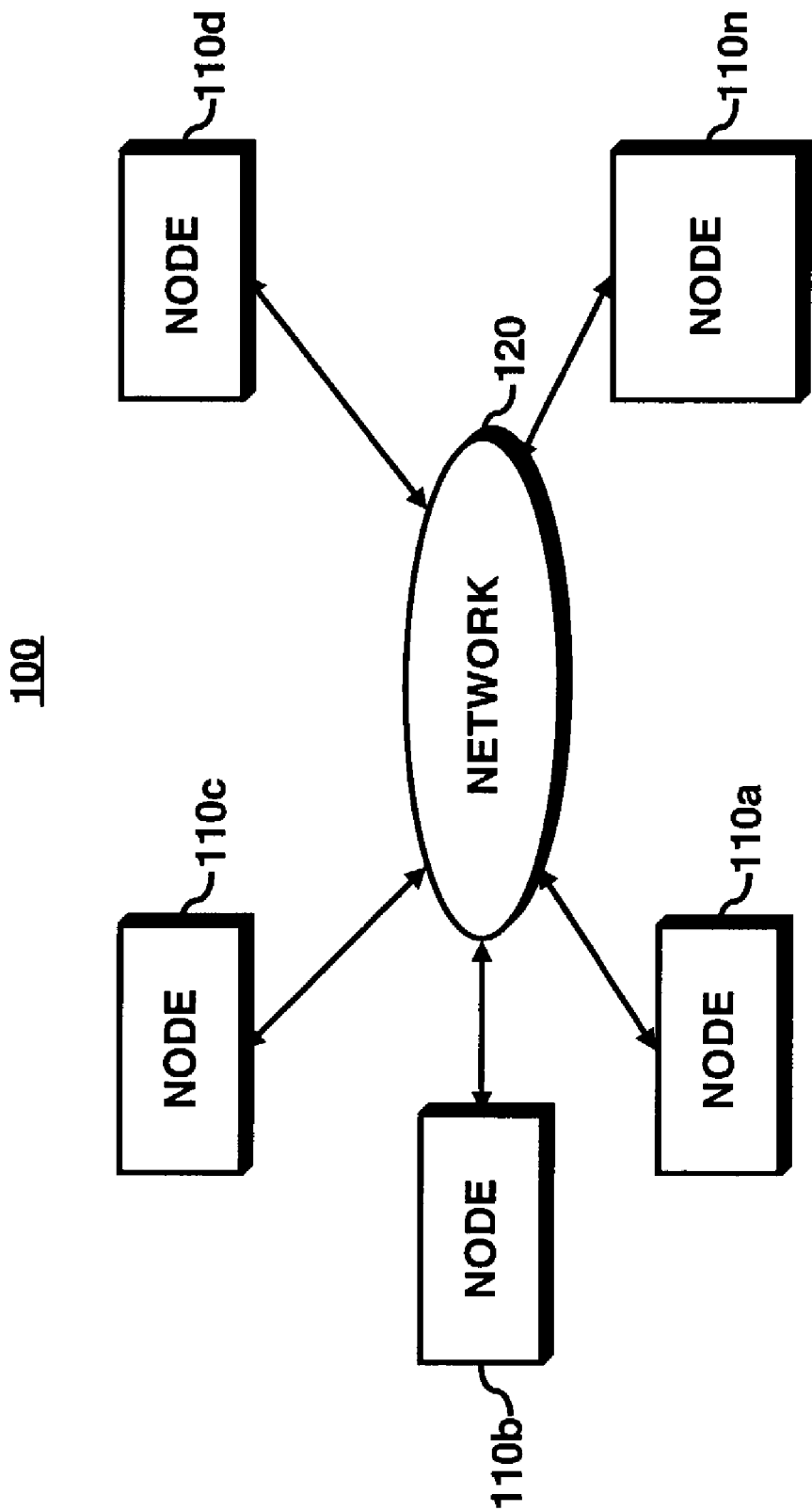
FIG. 1 illustrates a P2P system, according to an embodiment of the invention.

FIG. 1 illustrates an exemplary block diagram of a system 100 where an embodiment of the present invention may be practiced. It should be readily apparent to those of ordinary skill in the art that the system 100 depicted in FIG. 1 represents a generalized schematic illustration and that other components may be added or existing components may be removed or modified without departing from the spirit or scope of the present invention.

As shown in FIG. 1, the system 100 includes a plurality of nodes 110a ... 110n functioning as peers in a P2P system. The nodes 110a ... 110n may be operable to exchange information among themselves and with other network nodes over a network 120. The nodes 110a ... 110n may also be operable to determine which nodes 110a ... 110n are valid and perform other functions (object search and retrieval, object placement, etc.) of a peer in a P2P system. Objects may include files, URLs, etc. The nodes 110a ... 110n may be computing platforms (e.g., personal digital assistants, laptop computers, workstations, servers, and other similar devices) that have a network interface. The nodes 110a ... 110n may be further operable to execute one or more software applications (not shown) that include the capability to share information (e.g., data, applications, etc.) in a P2P manner.

The network 120 may be operable to provide a communication channel among the nodes 110a ... 110n. The network 120 may be implemented as a local area network, wide area network or combination thereof. The network 120 may implement wired protocols, such as Ethernet, token ring, etc., wireless protocols, such as Cellular Digital Packet Data, Mobitex, IEEE 801.11b, Bluetooth, Wireless Application Protocol, Global System for Mobiles, etc., or combination thereof.

In one embodiment, the system 100 is a distributed hash system (e.g., CAN, Pastry, Tapestry, Chord, etc.). In a distributed hash system a lookup for locating an object in the system 100 is performed by searching with a key associated with the object. These systems typically "guarantee" the retrieval of an existing object by searching with the key, as apposed to a system, such as Freenet, which typically does not provide an equivalent level of "guaranteed" object retrieval.

In one embodiment, the system 100 includes a distributed file system having a conventional tree-like structure overlaid on a P2P system. Each object (e.g., directories containing meta data, files containing other data, etc.) in the system 100, which can reside on any of the nodes 110*a* . . . 110*n*, contains names of children objects and location information (e.g., point(s) in the Cartesian space in the case of CAN) for each child object. Name and location information for children objects may be stored as meta-data with the objects. When location information is provided with directories, the placement of objects in the system 100 becomes controllable. Objects may be placed in the system 100 to minimize lookup costs, such as described in detail below.

From a user's point of view, a path identifies object in a file system. A path is similar to "/a/b/c", where "a" and "b" are referred as directories and "c" (the last component in the path) is referred as file. When a user wants to access a file, a lookup operation is performed to resolve the location of the file, except the previous lookup result is cached. Thus, lookups comprise a high portion of total metadata operations in file systems. A lookup is accomplished by resolving one component at a time in a path, starting from "/" (root directory), until all the components in the path are resolved. At the end of the lookup process, the location of the object is returned. However, in a file system, typically directories and files are both kept as objects. Therefore, an object may refer to a directory or a file, and the meaning is clear based on the context.

In the system 100, where a distributed file system is overlaid on a P2P system, a parent object may reside at one location in the P2P system, and a child object may reside in another location in the P2P system. The locations, for example, can be the same node in the P2P system, or different nodes. This is generally irrespective of whether or not the distributed file system is overlaid on a P2P system.

In order to resolve a path to an object in the system 100, a lookup operation may require resolving every component in the path. Component resolution typically involves routing a query to a node hosting the parent directory. The node hosting the parent directory resolves the directory, finds the location of the next component and sends the query to the node that hosts the next component. The process is repeated until the desired object is located. After the path is resolved, the object may be retrieved using the path.

Lookup costs may be measured based on the number of routing hops (i.e., logical hops) taken by the query in the system 100. A lookup cost may be expressed as D multiplied by h, where D is the length (the number of components in the path) of a path (e.g., "/a/b/d") to an object, and h is the number of average logical routing hops resolving one component of the path. The logical hop is a routing hop in an overlay network, such as CAN. Each logical hop may comprise multiple IP-level physical hops.

By controlling the placement of objects, lookup costs for the system 100 may be reduced. For example, by placing child objects in close proximity to their parent objects, the number of logical hops taken by a query for resolving a path is significantly reduced.

According to an embodiment of the invention, objects may be placed in the system 100 using a radius delta algorithm, which reduces lookup costs. The radius-delta algorithm is disclosed in co-pending U.S. patent application Ser. No. 10/260,425, herein incorporated by reference. The radius-delta algorithm is also described in detail below. The radius-delta algorithm places a child object within a predetermined distance, in terms of logical hops, to its parent object. Thus, lookup cost reduced by controlling the maximum number of logical hops a child object being placed from a parent object.

In addition to reducing lookup costs for the system 100, storage utilization should be maximized for a distributed file system overlaid on the P2P system. According to an embodiment of the invention, an object may be placed in the system 100 using a hill-climbing algorithm, which optimizes storage utilization. The hill-climbing algorithm selects a node for object placement based on the storage utilization for the node.

Figure 2:
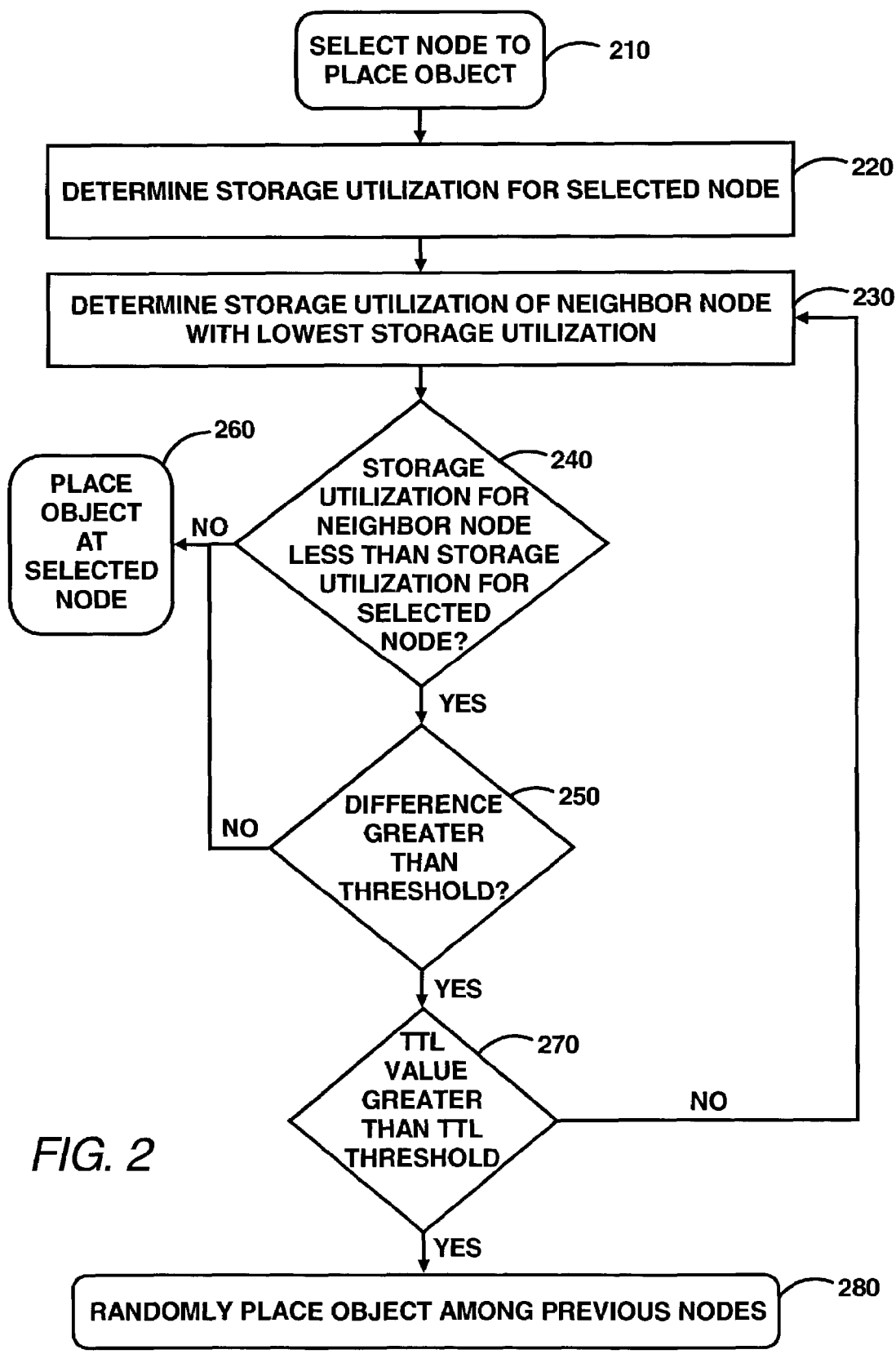
FIG. 2 illustrates a flow diagram of a method for placing an object using a hill-climbing algorithm in the P2P system shown in FIG. 1, according to an embodiment of the invention.

FIG. 2 illustrates a method 200, according to an embodiment of the invention, for placing an object in the system 100 using the hill-climbing algorithm. In step 210, an initial node (e.g., the node 110*b*) is selected for placing the object. The initial node may be randomly selected and becomes the starting point in the hill-climbing algorithm for placing the object or the initial node may be the node that hosts the object's parent directories. In one embodiment, the initial node may be selected using the radius-delta algorithm. Steps for selecting the initial node using the radius-delta algorithm are described in detail with respect to the method 500.

In step 220, storage utilization for the node 110*b* is determined. For example, the node 110*b* may periodically compute storage utilization, using known techniques, and stores it in memory. The storage utilization includes the disk capacity being used to store objects in a node at a given time. The storage capacity may fluctuate at different times. For example, when data surges occur in the system 100, storage capacity may be over 80%, and only 20% or less of the total disk capacity of the node is not being used to store objects.

In step 230, storage utilizations for neighboring nodes are determined. Neighboring nodes' identity are kept in the current node, for example, node 110*b*. In one embodiment, storage utilization for all the neighboring nodes is determined, and the neighboring node with the lowest storage utilization is selected for possible placement of the object. Storage utilizations for neighboring nodes may be determined using heartbeats. Heartbeats are typically exchanged between nodes to determine a status of the nodes. Storage utilization information may be sent in heartbeat messages exchanged among neighboring nodes.

In step 240, the node 110*b* determines if the storage utilization of the neighboring node with the lowest storage utilization, e.g., 110*c*, is less than the storage utilization for itself. If the storage utilization of the node 110*c* is less than the storage utilization of the node 110*b*, then the difference is computed and is compared to a threshold (step 250). In step 250, the threshold may be based on the total number of nodes and the total number of objects in the system. If the number of nodes and the number of objects is not known, then an absolute value weighted with parameters of the system may be used.

In step 250, if the difference between the storage utilization of 110*b* and the storage utilization of the node 110*c* is less than the threshold, the object is placed at the node 110*b* (step 260).

In steps 240 and 250, random algorithms may resolve ties. For example, if the storage utilizations of the nodes 110*b* and 110*c* are substantially the same in step 240, the placement of the object may be randomly selected. In step 250, if the difference is substantially the same as the threshold, then placement may also be randomly determined.

The hill-climbing algorithm does not always settle the placement of the object at the first selected node (i.e., the initial node or the current node), such as the node 110*b* in the example above. If the difference is greater than the threshold (as determined in step 250), the object is handed over from node 110*b* to node 110*c*, and the node 10*c* becomes the initial node. The initial node determines if the object should be placed on itself by repeating steps 230-260. If it is determined the object cannot be placed on the current node, another neighboring node may be selected as the current node. This process repeats until all neighboring nodes have higher storage utilizations or the TTL threshold is reached (as explained below). Repeating steps 230-260 is shown in FIG. 2 with the arrow from step 270 to step 230.

In order to control the number of iterations it takes to place an object, thus to reduce the latency to place an object, a time-to-live (TTL) value is used. Essentially the TTL value is the number of times the object is handed over. The TTL value is incremented every time the object is handed over to a neighboring node. The TTL threshold may be selected based on a maximum length of time that is allowed to place an object. The TTL value is incremented and is forwarded from each neighboring node that determines not to place the object. The initial TTL value may be sent to a neighboring node with a request to place the object. If the TTL value is greater than the TTL threshold (as determined in step 270), then the object may be placed at the node randomly selected in step 210 (step 280). Alternatively, the object may be randomly placed at any of the nodes that have previously rejected placement therein (step 280). If the TTL value is not greater than the TTL threshold, then the method 200 returns to step 230, where storage utilizations for neighboring nodes, e.g. 110c, are determined. As described above, the steps 230-260 are repeated. If it is determined the object cannot be placed on the current node, another neighboring node may be selected as the current node. This process repeats until all neighboring nodes have higher storage utilizations or the TTL threshold is reached.

In step 210, a node may be selected for placing the object initially and use hill-climbing as the optimization. In one embodiment, the node may be selected using the radius-delta algorithm, which minimizes lookup costs. As discussed above, the radius-delta algorithm places a child object within a predetermined distance, in terms of logical hops, to a parent object.

Figure 3:
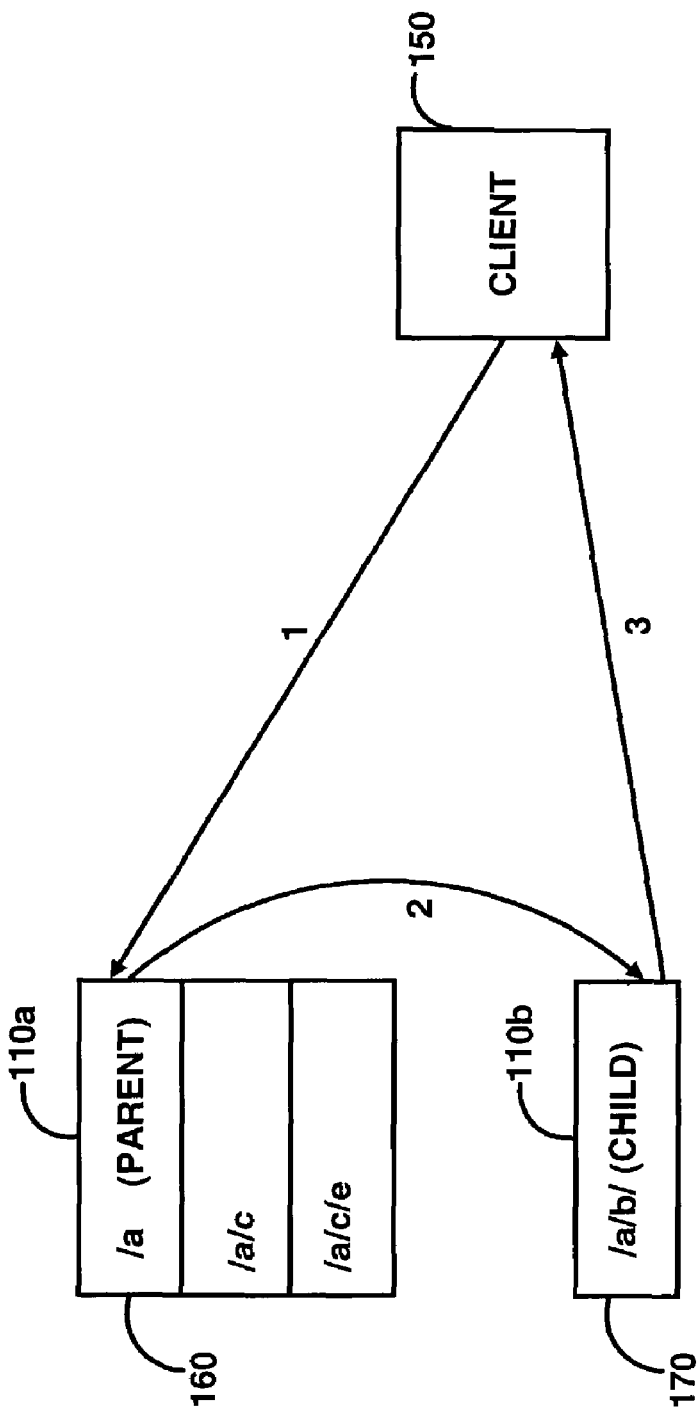
FIG. 3 illustrates a lookup performed in the P2P system shown in FIG. 1, according to an embodiment of the invention.

FIG. 3 illustrates placing an object in the system 100 using the radius-delta algorithm, according to an embodiment of the invention. Instead of randomly placing an object anywhere in the system 100, the object (e.g., a child object) is randomly placed within a logical space relative to the parent node. A logical space is the space that contains one or more nodes within a predetermined distance, in terms of logical hops, to another node, such as a parent node. The size of the logical space may be determined by a constant R. The constant R may vary depending on the type of P2P system that is implemented. However, R is generally defined such that the number of logical hops between a parent object and a child object are limited.

In one embodiment, R is based on a range of consecutive keys. Typically, consecutive keys identify objects hosted by nodes within a limited number of logical hops from each other. Therefore, a child object may be randomly placed at a node hosting objects identified by keys near a key for a parent object. The consecutive keys may identify nodes in a variety of P2P implementations, including but not limited to CAN.

For example, R may include keys of plus or minus three from a key identifying the parent object. Thus, if the parent node 110a hosts a parent object having a key of 7, the child object may be randomly placed at a node hosting objects identified by key between 4 and 10. If node 110b hosts objects identified by any of keys 4-10, then the child object may be placed at node 110b.

The logical space, as defined by R in a CAN system, may contain neighboring nodes to the parent node. In another embodiment, the logical space may be limited to the zone controlled by the parent node and the neighboring zones. These values of R are provided as examples. Other values of R may be used to optimize a system accordingly.

Figure 4:
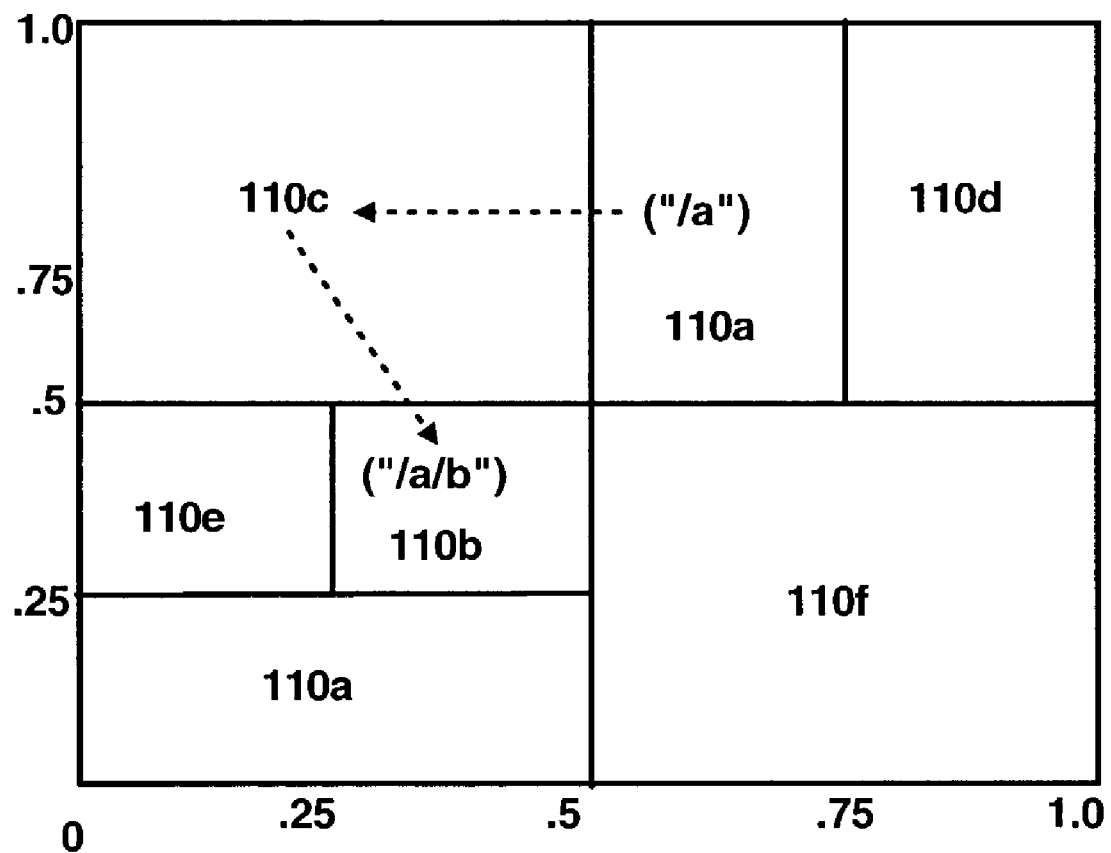
FIG. 4 illustrates the P2P system shown in FIG. 1 as a content-addressable network.
Figure 5:
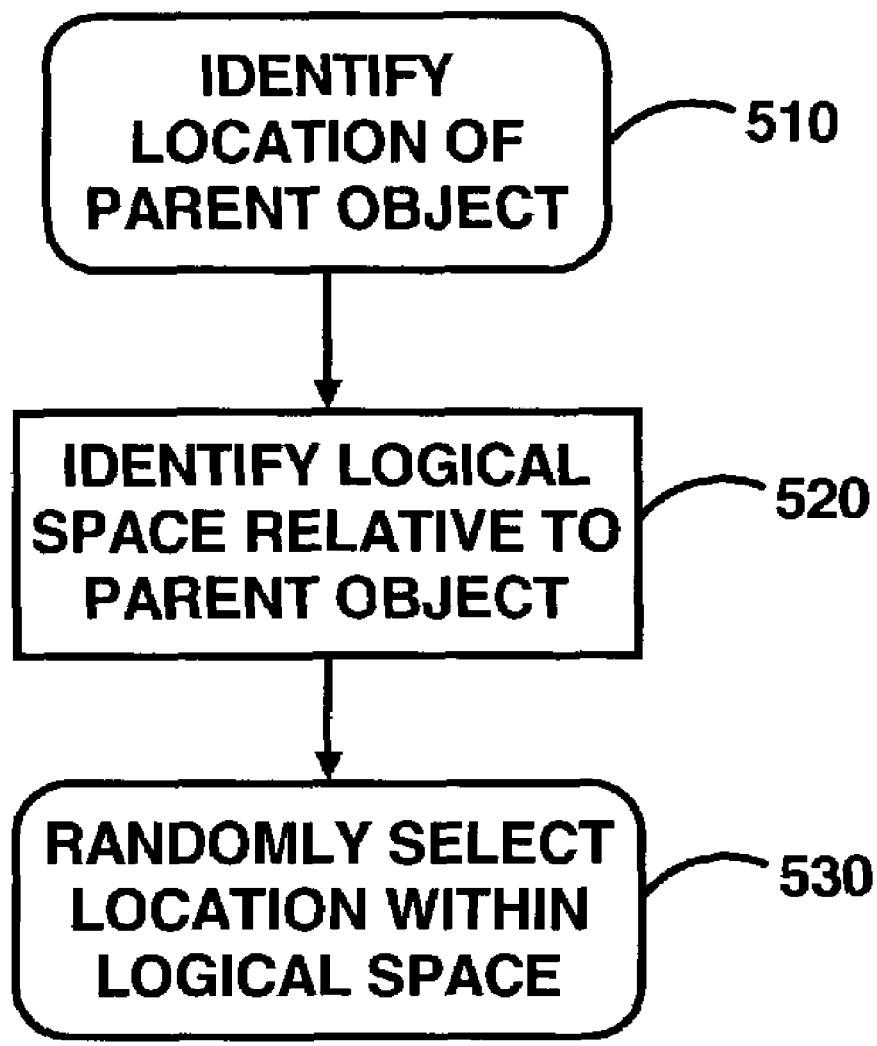
FIG. 5 illustrates a flow diagram of a method for selecting a node for placing an object in the P2P system shown in FIG. 1, according to an embodiment of the invention.

FIG. 4 illustrates the system 100 implemented as a two-dimensional CAN coordinate system having a virtual space of $[0,1]\times[0,1]$. The node 110a, for example, contains the parent object (i.e., directory "/a"). The node 110a has a zone between 0.5 to 0.75 for the x-axis and 0.5 to 1 for the y-axis. If R is, for example, 0.25, then a child object (e.g., "/a/b") is placed randomly anywhere between 0.25 to 1 for the x-axis and 0.25 to 1 for the y-axis. Thus, R defines an area for the logical space, which has an x-axis from 0.25 to 1 and a y-axis from 0.25 to 1 in the Cartesian coordinate system. The sub-directory "/a/b" is shown as being created at node 110b having a zone of $[0.25-0.5]\times[0.25-0.5]$. The dashed line illustrates routing a query to the node 110b for performing a lookup. Lookup costs are minimized by controlling the placement of the child object in the logical space defined by the constant R. FIG. 5 is a flow diagram of a method 500, according to an embodiment of the invention, for selecting an initial node according to the radius-delta algorithm. The steps of the method 500 may be performed in step 210 of the method 200, where an initial node to place an object is selected according to the radius-delta algorithm. In step 510, a client identifies the location of a parent object. For example, the client (e.g., the client 150 in the system 100 shown in FIG. 1) determines a location of the parent object, which may include identifying the key associated with the parent object. The client may be a node in the system 100.

In step 520, the client 150 identifies a logical space relative to the location of the parent object for placing the child object. The logical space may be defined by a constant R. For example, R may be a range of keys or coordinates in a CAN system associated with nodes in the logical space.

In step 530, the client 150 randomly selects a location within the logical space for placing the child object. The location contains a node in the system 100. After this step, the hill-climbing algorithm may be used to select the optimal node to place the object around the node selected by the radius-delta algorithm to further optimize the storage utilization.

The method 500 may use a range of keys or an area in a CAN system for defining the logical space. It will be apparent to one of ordinary skill in the art that other techniques may be used for determining the logical space. For example, for a content addressable network (CAN), the logical space may be limited to neighboring zones (i.e. zones neighboring the zone controlled by the node hosting the parent object).

The methods 200 and 500 are not limited to determining a logical space for placing an object in a P2P, shared, file system. The methods and techniques described above may be applied to any application that exists in a tree form to minimize latency (e.g., Btrees and Tries used for indexing in database systems).

The steps of the methods 200 and 500 may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be operable to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Figure 6:
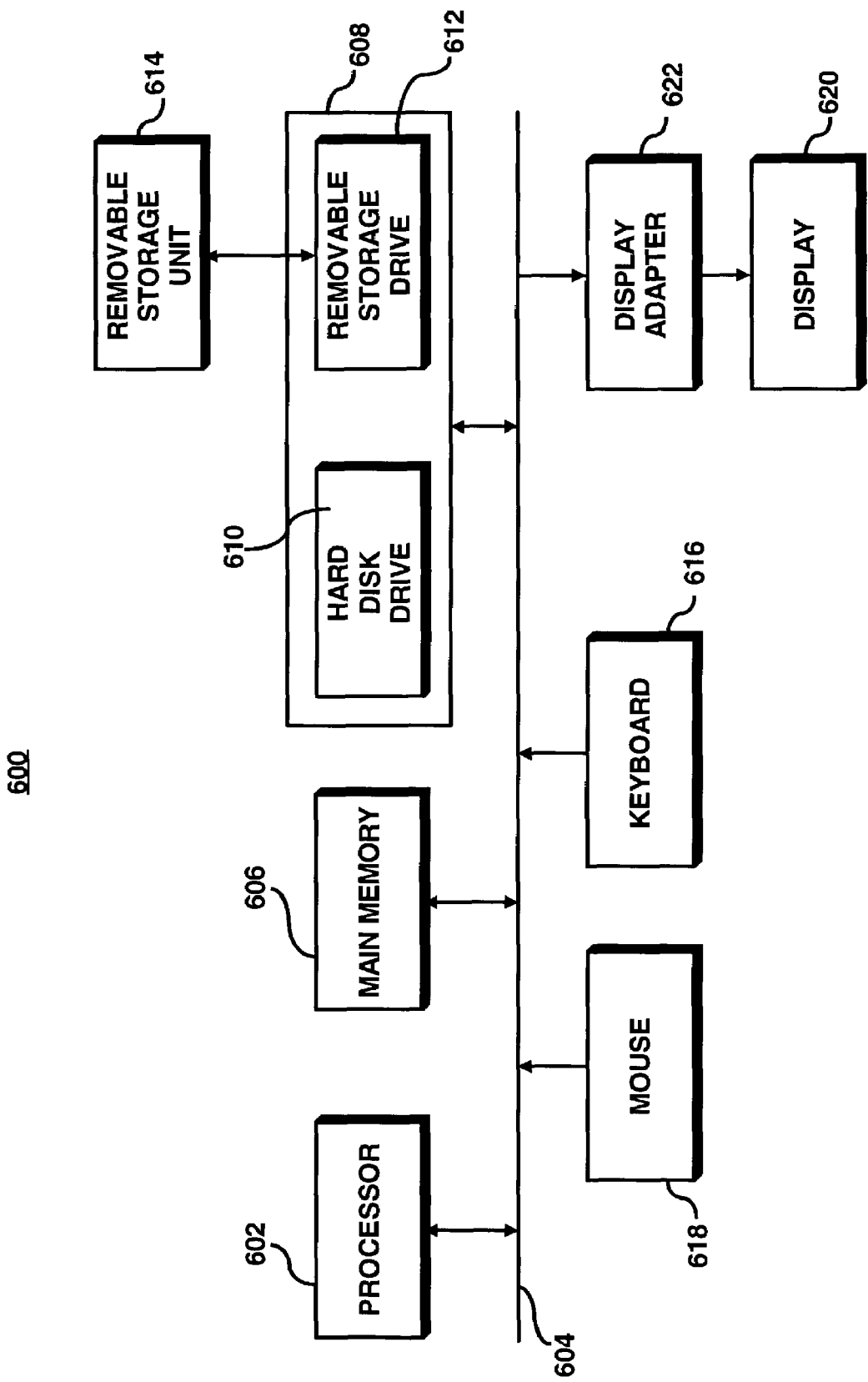
FIG. 6 illustrates a computer platform for a node in a P2P system, according to an embodiment of the invention.

FIG. 6 illustrates an exemplary computer platform 600, according to an embodiment of the invention, for any of the nodes 110a . . . n or the client 150. The platform includes one or more processors, such as the processor 602, that provide an execution platform for software. The software, for example, may execute the steps of the method 400, perform standard P2P functions, etc. Commands and data from the processor 602 are communicated over a communication bus 604. The platform 600 also includes a main memory 606, such as a Random Access Memory (RAM), where the software may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the peer privacy module may be stored. The removable storage drive 612 reads from and/or writes to a removable storage unit 614 in a well-known manner. A user interfaces may interface with the platform 600 with a keyboard 616, a mouse 618, and a display 620. The display adaptor 622 interfaces with the communication bus 604 and the display 620 and receives display data from the processor 602 and converts the display data into display commands for the display 620.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method implemented with hardware for placing a selected object in a peer-to-peer system comprising steps of:
    selecting an initial node as a candidate to place the object;
    determining a storage utilization for the current candidate;
    identifying a neighboring node of the current candidate, wherein the identified neighboring node has a lowest storage utilization among at least some neighbor nodes of the current candidate; and
    comparing the storage utilization of the current candidate to the storage utilization of the identified neighboring node for placing the object.

2. The method of claim 1, further comprising placing the object on the current candidate or handing over the object to the identified neighboring node based on the comparison.

3. The method of claim 1, wherein the step of comparing further comprises steps of:
    determining whether the storage utilization of the identified neighboring node is less than the storage utilization of the current candidate ; and
    placing the object at the current candidate in response to the storage utilization of the identified neighboring node not being less than the storage utilization of the current candidate.

4. The method of claim 3, wherein the step of comparing further comprises steps of:
    determining whether a difference between the storage utilization of the current candidate and the storage utilization of the identified neighboring node is greater than a threshold in response to the storage utilization of the identified neighboring node being less than the storage utilization of the current candidate;
    placing the object at the current candidate in response to the difference not being greater than the threshold; and
    determining whether a time-to-live (TTL) value associated with placement of the object is greater than a TTL threshold in response to the difference being greater than the threshold.

5. The method of claim 4, wherein the step of comparing further comprises steps of:
    in response to the TTL value not being greater than the TTL threshold, handing the object over from the current candidate to the identified neighboring node, wherein the identified neighboring node becomes the current candidate and the steps of determining, identifying and comparing from claim 1 are repeated.

6. The method of claim 4, wherein the step of comparing further comprises steps of:
    in response to the TTL value being greater than the TTL threshold, randomly placing the object at a node in the peer-to-peer system that previously decided not to host the object based on a comparison of storage utilization with the neighboring nodes.

7. The method of claim 1, wherein the step of comparing further comprises steps of:
    determining whether the storage utilization of the current candidate and the identified neighboring node is substantially equal; and
    randomly selecting either the initial node or the identified neighbor node to place the object in response to storage utilization of the current candidate and the identified neighboring node being substantially equal.

8. The method of claim 1, wherein the step of selecting the initial node further comprises steps of:
    identifying a location of a parent object of the object;
    identifying a logical space relative to the location of the parent object; and selecting a node within the logical space to be the initial node.

9. The method of claim 8, wherein the step of selecting the node within the logical space further comprises a step of randomly selecting the node within the logical space.

10. The method of claim 8, wherein the peer-to-peer system comprises a distributed file system overlaid on the peer-to-peer system, and the parent object includes the location of the object.

11. The method of claim 10, wherein the logical space has a predetermined area within a CAN Cartesian coordinate space.

12. The method of claim 11, wherein the logical space comprises a space having a size based on a distance R from the parent node, the space containing neighboring nodes to the parent node.

13. The method of claim 12, wherein the distance R is based on a predetermined number of logical hops.

14. A peer-to-peer system comprising:
    a plurality of nodes functioning as a distributed, shared, file system, the plurality of nodes including at least an initial node and a plurality of neighbor nodes to the initial node; and
    the initial node is operable to identify a selected neighboring node of the plurality of neighboring nodes having a lowest storage utilization and is operable to determine whether to place an object on itself or to hand over the object to the identified neighboring node based on a comparison of storage utilizations for the initial node and the selected neighboring node.

15. The system of claim 14, wherein the initial node is operable to place the object at the initial node in response to the storage utilization of the identified neighboring node being greater than the storage utilization of the initial node.

16. The system of claim 15, wherein the initial node is operable to determining whether a difference between the storage utilization of the initial node and the storage utilization of the identified neighboring node is greater than a threshold in response to the storage utilization of the identified neighboring node being less than the storage utilization of the initial node.

17. The system of claim 16 wherein the initial node is operable to place the object at the initial node in response to the difference being less than the threshold;
    determine whether a time-to-live (TTL) value associated with placement of the object is greater than a TTL threshold in response to the difference being greater than the threshold; and
    in response to the TTL value not being greater than the TTL threshold, handing over the object to the identified neighboring node, in response to the TTL value being greater than the TTL threshold, place the object randomly at one of the nodes that previously rejected a placement request for the object.

18. The system of claim 14, wherein the plurality of nodes function as a distributed, shared, file system, the file system including a plurality of parent objects including name and logical location of the associated child objects; and the object being placed is a child object of one of the plurality of parent objects.

19. The system of claim 18, wherein the initial node is a node randomly selected from a plurality of nodes within a logical space relative to a parent node, the parent node being a node hosting the parent object of the object being placed.

20. The system of claim 19, wherein the logical space is based on a predetermined distance from the parent node, the predetermined distance being in terms of logical hops.

21. A node in a peer-to-peer system comprising:
    means for determining a storage utilization for the node, the node being a current candidate for placing an object;
    means for identifying a neighboring node of the current candidate, wherein the identified neighboring node has a lowest storage utilization among at least some neighbor nodes of the current candidate; and
    means for comparing the storage utilization of the current candidate to the storage utilization of the identified neighboring node for placing the object.

22. The node of claim 21, wherein the means for comparing further comprises:
    means for determining whether the storage utilization of the identified neighboring node is less than the storage utilization of the current candidate; and
    means for placing the object at the current candidate in response to the storage utilization of the identified neighboring node being greater than the storage utilization of the current candidate.

23. The node of claim 22, wherein the means for comparing further comprises:
    means for determining whether a difference between the storage utilization of the current candidate and the storage utilization of the identified neighboring node is greater than a threshold in response to the storage utilization of the identified neighboring node being less than the storage utilization of the initial node;
    means for placing the object at the current candidate node in response to the difference being less than the threshold; and
    means for determining whether a time-to-live (TTL) value associated with placement of the object is greater than a TTL threshold in response to the difference being greater than the threshold.

24. The node of claim 23, wherein the means for comparing further comprises:
    means for placing the object at the current candidate in response to the TTL value being greater than the TTL threshold; and
    means for determining not to place the object at the current candidate in response to the TTL value being less than the TTL threshold and handing over the object to another neighboring node becoming a new current candidate for placing the object.

* * * * *

UNITED STATES PATENT AND TRADEMARK OFFICE
CERTIFICATE OF CORRECTION

PATENT NO.      : 7,555,553 B2
APPLICATION NO. : 10/260430
DATED           : June 30, 2009
INVENTOR(S)     : Zheng Zhang et al.

It is certified that error appears in the above-identified patent and that said Letters Patent is hereby corrected as shown below:

In column 4, line 65, delete "10c" and insert -- 1 1 0c --, therefor.

Signed and Sealed this

Tenth Day of November, 2009

David J. Kappos
*Director of the United States Patent and Trademark Office*